Nov. 7, 1961 R. T. HEFTYE ET AL 3,007,383
ROTARY SHUTTER CAMERA
Filed Nov. 13, 1959 4 Sheets-Sheet 1

FLIGHT DIRECTION

INVENTORS:
Rudolph T. Heftye
Robert H. Summers
Milton S. Weiss
By Forrest J. Lilly
Attorney

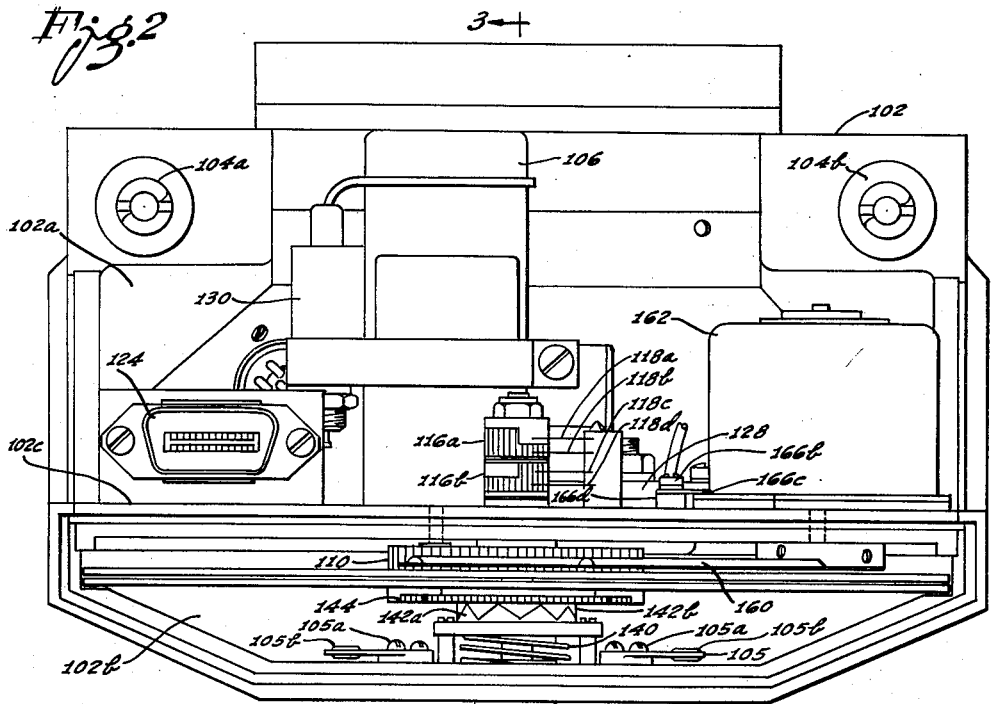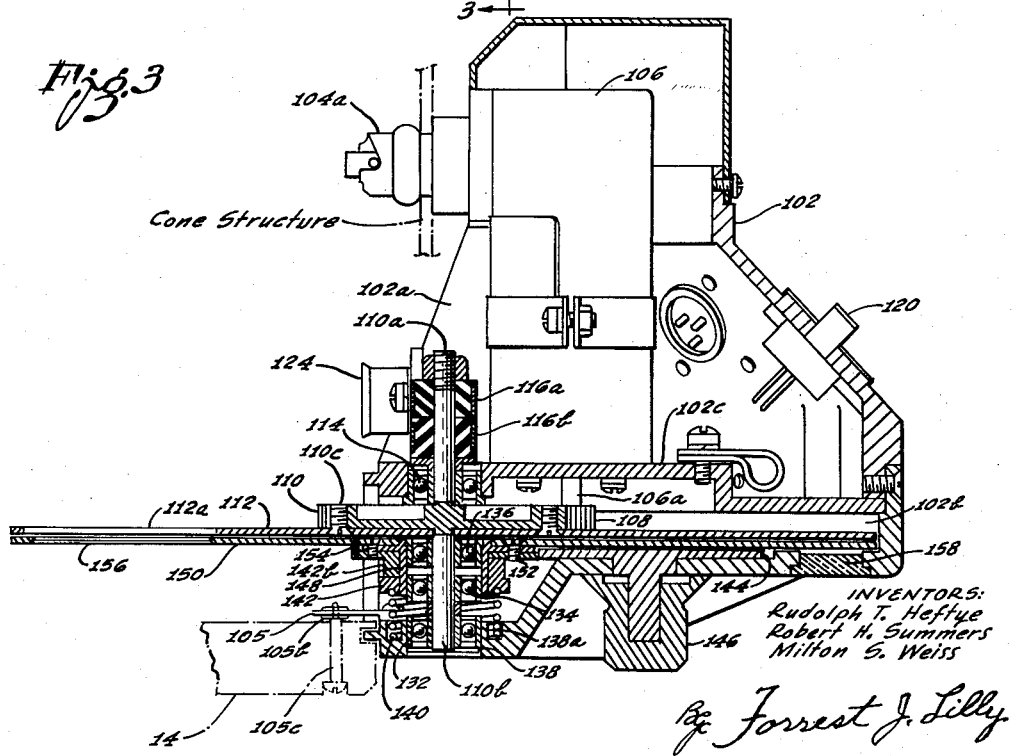

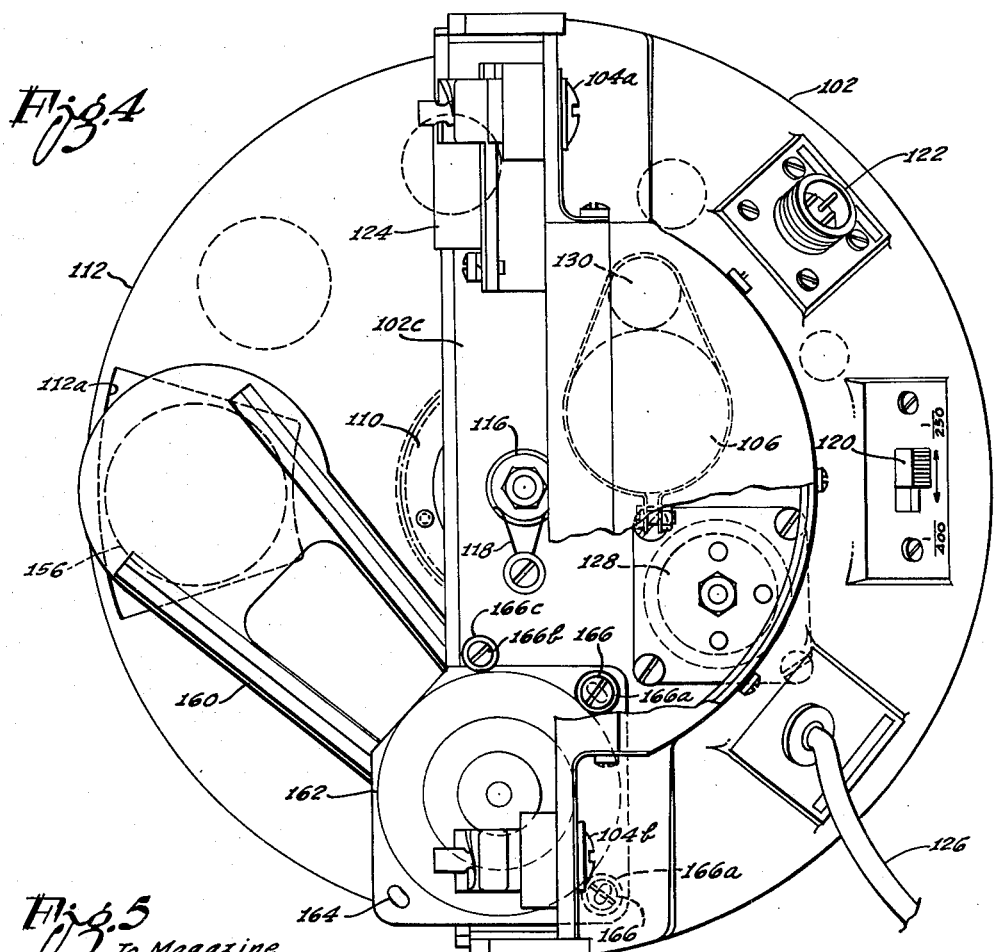
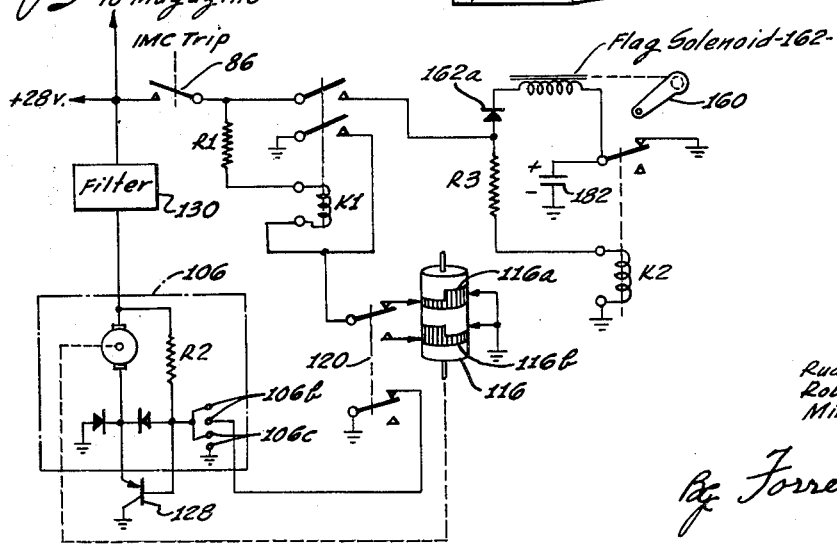

Nov. 7, 1961   R. T. HEFTYE ET AL   3,007,383
ROTARY SHUTTER CAMERA
Filed Nov. 13, 1959   4 Sheets-Sheet 4
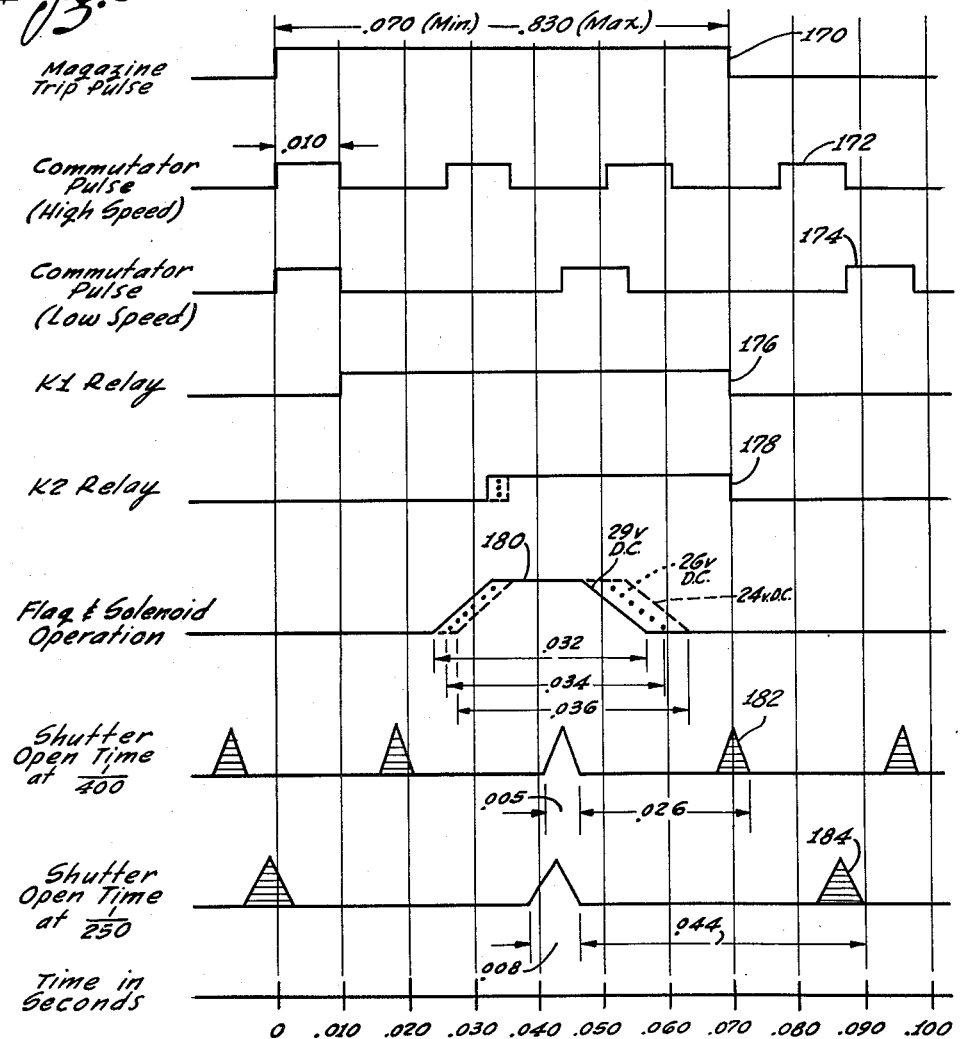
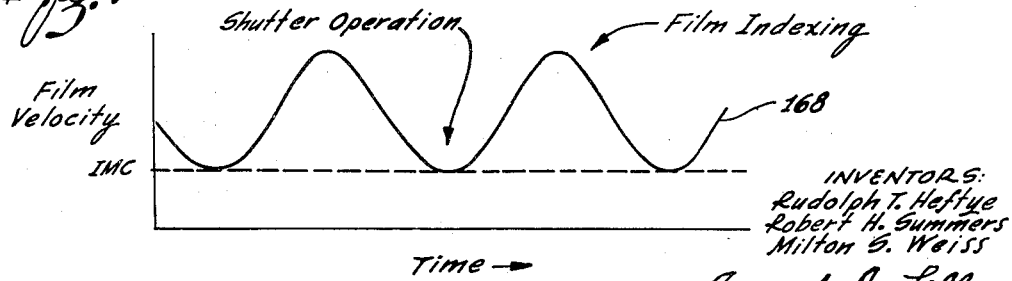
INVENTORS:
Rudolph T. Heftye
Robert H. Summers
Milton S. Weiss
By Forrest J. Lilly
Attorney United States Patent Office 3,007,383
Patented Nov. 7, 1961

3,007,383
ROTARY SHUTTER CAMERA
Rudolph T. Heftye, Monterey Park, and Robert H. Summers and Milton S. Weiss, Los Angeles, Calif., assignors to Hycon Mfg. Company, Pasadena, Calif., a corporation of Delaware
Filed Nov. 13, 1959, Ser. No. 852,731
6 Claims. (Cl. 95—12.5)

Our invention relates generally to aerial cameras and more particularly to a versatile rotary shutter camera having a wide range of operative settings for different operating conditions.

An aerial reconnaissance camera for use in drones or light aircraft must normally be a lightweight unit in addition to being small and compact in size. These limitations severely restrict the versatility of operation that can be incorporated into a reconnaissance camera. However, aerial reconnaissance cameras generally require image motion compensation (IMC) in order to prevent blurring of the image on film, and different IMC settings are further required for different flight altitudes and speeds of the drone or aircraft mounting the aerial camera. At least two different shutter speeds are desirable and several different f/number shutter settings are often required for satisfactory reconnaissance operation of an aerial camera. While desirable and sometimes necessary, incorporation of these features into an aerial camera requires additional structure and components, and inevitably increases the size and/or weight of a reconnaissance camera beyond the permissible limits.

It is an object of our invention to provide a lightweight areial reconnaissance camera which is small and compact but highly versatile in operation.

Another object of the invention is to provide a lightweight aerial camera which is capable of supplying a number of image motion compensation rates, different shutter speeds and several f/number settings that can be selected according to operating conditions.

A further object of this invention is to provide a long focal length aerial camera which is small, compact and light in weight.

A still further object of our invention is to provide a solenoid operated flag-capping shutter for a reconnaissance camera wherein bouncing and rebounds of the flag is completely eliminated in operation.

Briefly, and in general terms, the foregoing and other objects are preferably accomplished by providing a reconnaissance camera including a film transport system for moving film in the camera continuously at a sinuously varying rate, a rotary aperture disc shutter mounted between lens elements, and a circuit for synchronizing shutter operation during film movement at a minimum (IMC) rate. The film transport mechanism can be adjusted to provide different minimum output rates which correspond to image motion compensation rates for different operating conditions of an airborne camera, and the shutter includes a two speed motor for rotating the aperture disc at different exposure speeds. The shutter also has a diaphragm stop disc with detent which provides a plurality of different selectable f/number stop openings. The film transport system operates a trip switch during film movement at image motion compensation rate, and shutter operation (exposure) is dependent on such operation of the trip switch. The synchronizing circuit includes a commutator which governs proper energization of control relays to operate the shutter for an exposure.

Our invention possesses other objects and features, some of which together with the foregoing, will be set forth in the following detailed description of a preferred embodiment of the invention. The invention will be more fully understood by reading the description with joint reference to the attached drawings, in which:

FIGURE 2 is a rear elevation view of the rotary shutter for the reconnaissance camera;

FIGURE 3 is a sectional view of the rotary shutter taken along the line 3—3 as indicated in FIGURE 2;

FIGURE 4 is a top plan view of the rotary shutter;

FIGURE 5 is a schematic wiring diagram for the rotary shutter camera;

FIGURE 6 is a series of graphs which is used to explain operation of the camera; and FIGURE 7 is a graph illustrating the sinuous output curve for the film transport system of FIGURE 1a.

Figure 1:
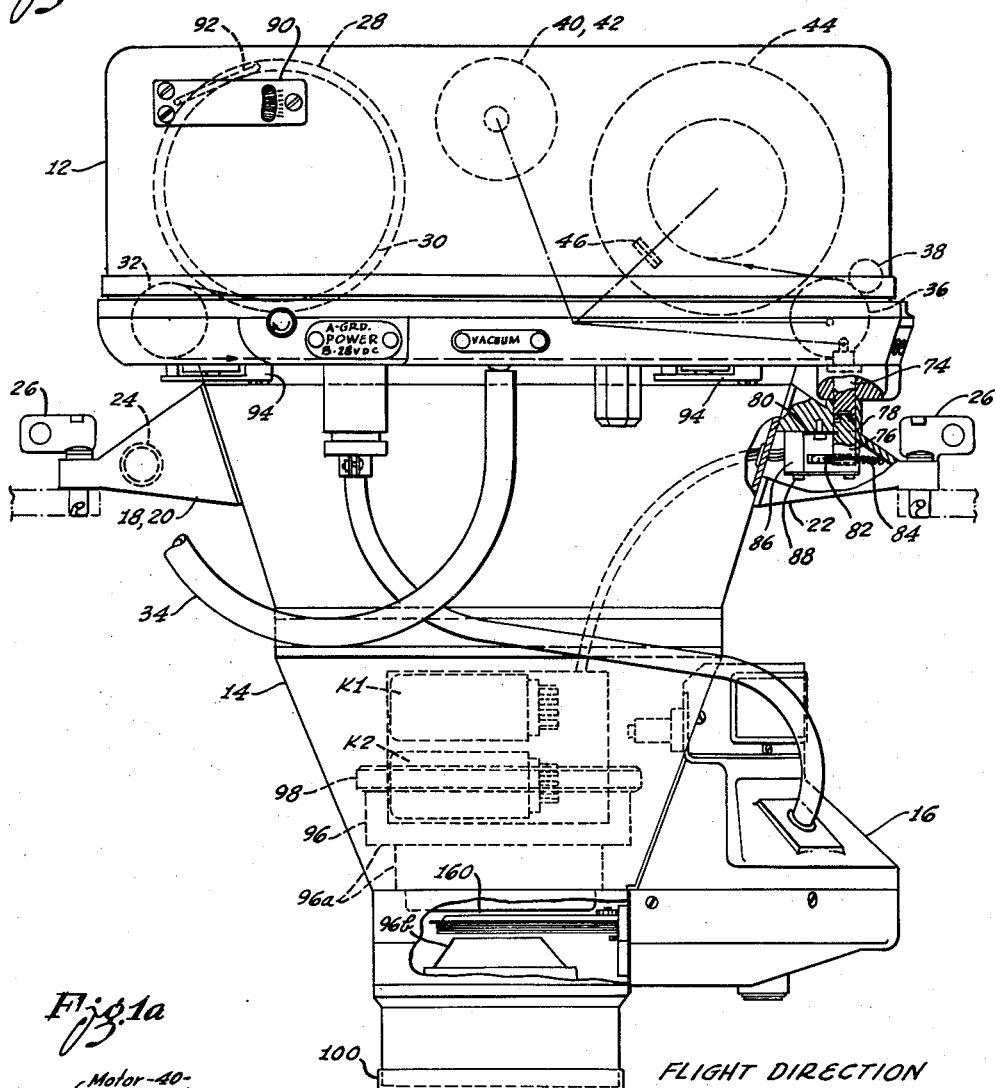
FIGURE 1 is a side elevational view of a preferred embodiment of our invention.

FIGURE 1 shows a side elevational view of a preferred embodiment of our invention. Aerial reconnaissance camera 10 generally comprises a magazine section 12, lens cone 14 and a shutter 16. The magazine section 12 is rectangularly shaped as seen in FIGURE 1 but appears generally square in a top plan view. That is, the rectangular magazine section 12 extends into the paper in FIGURE 1 a distance equal to the width of the magazine section 12. The square outline of the magazine section 12 in such a top plan view would also show three mounting lugs 18, 20 and 22 extending beyond the square magazine outline. Two of the lugs 18 and 20 are located near the corners of the left (rear) end of the magazine section 12 and are connected by a tube 24 which functions as a carrying handle. The lug 22 is located equidistantly between the corners of the right (forward) end of the magazine section 12 in the top plan view. These lugs 18, 20 and 22 are affixed to the rear and forward walls of the lens cone 14 which has a generally trapezoidal cross section in the side elevation view of FIGURE 1. The side walls of the lens cone 14 are generally parallel to the plane of the paper and do not taper (incline) together as do the rear and forward walls. Fasteners 26 at the ends of the lugs 18, 20 and 22 secure the camera 10 to fixed structure of a drone or light aircraft. The camera 10 is mounted as illustrated in FIGURE 1 with flight direction of the aircraft to the right as indicated by the large arrow.

Figure 1A:
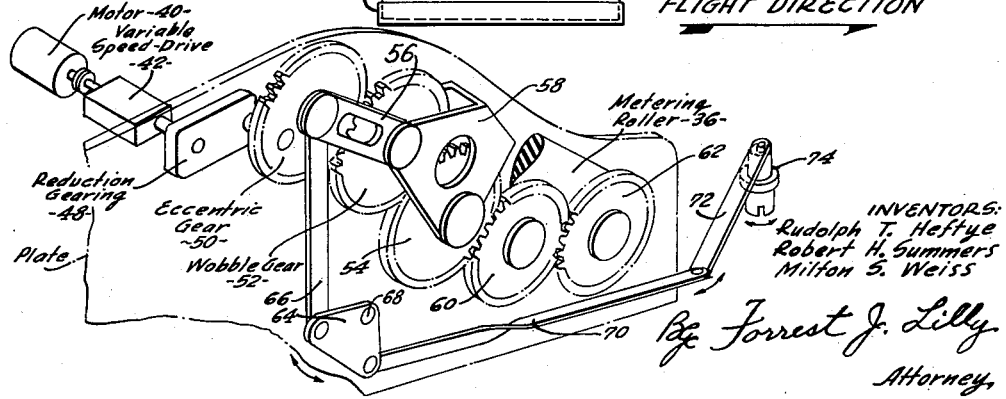
FIGURE 1a is a drawing illustrating a film transport system for driving film in a reconnaissance camera at a sinuously varying rate.

The magazine section 12 houses a supply spool 28 supplying film 30 which is looped around a guide roller 32 and passes before the face of a vacuum platen (not shown) that is located in the focal plane of the camera lens system. The hose 34 applies a light, continuous vacuum to the platen. The film 30 is next looped about metering roller 36 and is held in contact therewith by pressure roller 38. The metering roller 36 is driven by a motor 40 and variable speed drive 42 combination through suitable gearing so that the film 30 is transported to takeup spool 44. Takeup spool 44 is driven through a slip clutch 46 and is wound up by the takeup spool 44. The film transport system is shown more clearly in FIGURE 1a. The motor 40 is coupled to a variable speed drive 42 which can be adjusted to provide different output speeds. The variable speed drive 42 is conventional and commercially available. A preferred variable speed drive is a type 3B Metron variable speed changer manufactured by Metron Instrument Company of Denver, Colo. The output of the variable speed drive 42 is connected through reduction gearing 48 to drive eccentric gear 50. The eccentric gear 50 meshes with a wobble gear 52 which, in turn, meshes with idler gear 54. The center of the wobble gear 52 is connected to the center of eccentric gear 52 by link 56, and also connected to the center of idler gear 54 by means of a bracket link 58. Thus, the wobble gear 52 is maintained in floating engagement with both the eccentric gear 50 and the idler gear 54. The eccentric gear 50 is affixed to the output shaft of the reduction gearing 48, and the idler gear 54 is rotatably mounted on its axle in fixed structure. The connecting link 56 and bracket link 58 rotatably connect the centers of the eccentric gear 50 to wobble gear 52 to idler gear 54, and do not affect the rotational freedom of the connected gears on their respective axes. The idler gear 54 meshes with gear 60 which, in turn, meshes with gear 62. The gear 60 is connected to drive the takeup spool 44 through the slip clutch 46 (FIGURE 1) and the gear 62 is axially affixed to one end of the metering roller 36. The film transport system just described is shown and claimed in a pending application of Curtis B. Warshawsky, Serial No. 636,771, filed January 28, 1957, now Patent No. 2,950,663. This system is a preferred transport system for use in the present invention, and forms a novel combination of especial utility.

The center of the eccentric gear 50 is also connected to an upper corner of a triangular arm 64 by a long link 66 which is pin pointed on both ends. The triangular arm 64 is thus rotatably reciprocated on its pivot axle 68 by the rotation of the eccentric gear 50. The plane of the triangular arm 64 is vertical, and the lower corner thereof is pin jointed to an end of a long, horizontal link 70 which is pin jointed at the other end to an arm 72, disposed right angularly to the horizontal link 70. The other end of the arm 72 is affixed to the upper end of a short drive shaft 74. The lower slotted end of the shaft 74 engages with the upper end of a switch actuating connecting shaft 76 located within the hollow mounting lug 22 as can be seen in FIGURE 1. The shaft 76 has a circular channel 78 cut near the upper end of the shaft 76 which can then be supported by a strip tab 80 having an end arcuately shaped to conform with the cylindrical inner surface of channel 78, so that the shaft 76 rides on the supporting end of the strip tab 80 as it is rotatably reciprocated. A disc cam 82 is affixed near the lower end of the shaft 76 in a plane perpendicular to the axis of the shaft 76. A spring 84 hooks onto an edge of the disc cam 82 and is anchored to the lug housing as shown in FIGURE 1. Another edge of the disc cam 82 engages the actuating arm of a switch 86 which is secured to the lug housing by screws 88. The disc cam 82 is shaped and positioned to actuate the switch 86 for about .07 to as much as .83 second during the image motion compensation period of each operation cycle of the camera. Operation (closure) of the switch 86 permits energization of the relays K1 and K2 mounted to the far side wall of the lens cone 14, as viewed in FIGURE 1.

Indicator 90 indicates the amount of film 30 remaining unused in the camera 10. A spring loaded lever arm 92 riding on the periphery of the film roll is directly connected to the indicator pointer to rotate the pointer with diminishment of the roll, and the indicator marks are suitably calibrated in feet of remaining film. The lens cone 14 is secured to the magazine section 12 by means of simple lever fasteners 94 positioned about the lower outer edges of the magazine section 12 and which engage the upper flange edges of the lens cone 14. The lens cone 14 mounts a 12 inch, f/6.0, seven element lens 96 plus filter optical system. The lens elements are arranged in two groups 96a and 96b to accommodate the between-the-lens shutter 16. A filter 98 threads onto the rear (upper) cell of the lens inside the lens cone 14. A glass shield 100 which threads onto the front (lower) cell of the lens is also provided to protect the lens for certain drone applications.

The shutter 16 is a rotary disc, drawer type shutter generally comprising a housing, rotary aperture disc, diaphragm stop disc with detent, a two speed shutter motor, and solenoid flag. FIGURES 2, 3, 4 and 5, together, illustrate the shutter 16 in detail. FIGURE 2 is an elevational view of the shutter 16 looking forward from behind the shutter, FIGURE 3 is a sectional view taken along the line 3—3 as indicated in FIGURE 2, FIGURE 4 is a top plan view of the shutter 16, and FIGURE 5 is a schematic wiring diagram for the camera. Referring to these figures, the housing 102 is somewhat hemispherical in shape and can be secured to the lens cone 14 (as shown in FIGURE 1) by means of two shock mount fasteners 104a and 104b which can be preferably type V fasteners manufactured by the Industrial Products Division of The General Tire and Rubber Company of Wabash, Ind., and which engage cone structure as indicated in FIGURE 3. Rotation of the fastener 104a, for example, after it is passed through a hole in the cone structure, bulges out a resilient band section on one side of the structure (wall), thus compressing the cone structure (wall) between the bulged band section and a larger resilient shoulder on the other side. The lower part of the shutter 16 is also supported on isolating mounts. Two brackets 105 are secured to the lower wall of housing 102 by screws 105a as shown in FIGURES 2 and 3. The brackets 105 have arms which extend outwardly and mount resilient grommets 105b at the ends of the arms. Screws 105c are threaded upright in cone 14 structure so that a pointed end of smaller diameter of each screw engages the hole of a corresponding grommet. Thus, the shutter 16 is fully isolated (shock mounted) from the body of the lens cone 14.

The housing 102 is divided into normally upper and lower compartments 102a and 102b by a floor partition 102c. The two speed shutter motor 106 is mounted in an upright position in the upper compartment 102a to the floor partition 102c such that its output shaft 106a extends through an opening into the lower compartment 102b. A pinion 108 is affixed to the end of the output shaft 106a and meshes with a larger gear 110 which is secured to the rotary aperture disc 112 by screws 110c (FIGURE 3). The disc 112 is a thin circular disc centrally mounted for rotation on the upright axle of the gear 110. The rotary disc 112 has an aperture 112a (FIGURE 4) which is the outer part of a sector cut bounded by outer and inner arcs of different radii.

The axle of the gear 110 includes a normally upper shaft 110a and a normally lower shaft 110b. The upper shaft is journaled near the gear 110 in a bearing 114 which is press fitted in a hole through the floor partition 102c. Above the bearing 114 and axially affixed to the upper shaft 110a is a commutator 116 having an upper section 116a and a lower section 116b. Two wire brushes bear against each section of the rotatable commutator 116. Each wire brush 118 is V-shaped as can be clearly seen in FIGURE 4. Wire brushes 118a and 118b ride on the circumference of upper commutator section 116a, and wire brushes 118c and 118d ride on the circumference of the lower commutator section 116b (FIGURE 2). One of the commutator sections, the upper section 116a, for example, is used for high speed operation of the shutter motor 106 and the other section 116b can be used for low speed operation of the shutter motor 106. Each commutator section has a conducting band about the circumference thereof and two brushes ride respectively on upper and lower halves of a conducting band. The upper halves, for example, of the two conducting bands have non-conducting gaps of 100 degrees and 160 degrees for the low and high speed sections, respectively. Both of the gaps (with the V-shaped wire brushes) produce commutator pulses of .010 second duration, for example, respectively for high and low speed operation of the shutter motor 106. Speed selection can be made by operating the switch 120 (FIGURES 4 and 5). Power, +28 volts D.C., is provided to receptacle 122 for the shutter 16, and interconnections to the relays K1 and K2 are made through plug receptacle 124. Power to the film transport (magazine) motor 40 is provided through lead 126. A transistor 128 is mounted to the floor partition 102c as shown in FIGURES 2 and 4, and a feed-through capacitive filter 130 for the shutter motor 106 is strapped to the body of motor 106.

The lower shaft 110b is journaled in three bearings 132, 134 and 136 as illustrated in FIGURE 3. The lower bearings 132 is press fitted into a cylindrical hole 138 in the bottom wall of the shutter housing 102. A circular channel 138a is cut around the hole 138 concentrically to accommodate the lower end of a compression spring 140, the upper end of which bears against the lower half 142a of detent 142 (FIGURE 2). The large teeth of the lower half 142a meshes with that of the upper half 142b of the detent. The upper detent half 142b has a lateral flange having gear teeth cut along the periphery thereof to mesh with the gear 144. Knob 146 is affixed to the shaft of gear 144 extending through the bottom wall of housing 102 as shown in FIGURE 3. A flanged cylindrical sleeve 148 having a short upper hub portion mounts the diaphragm stop disc 150 about the hub portion, on the flange. The bearings 134 and 136 are pressed onto the lower shaft 110b into the cylindrical sleeve 148, and the detent halves 142a and 142b are positioned about the outside surface of the cylindrical sleeve 148 below its flange as shown in FIGURE 3. Screws 152 secure the diaphragm stop disc 150, the flange of the cylindrical sleeve 148 and the upper detent half 142b together. Two roll pins 154 are pressed into holes in the diaphragm stop disc 150 which locate the pins dependently between gear teeth along the periphery of the flange of the upper detent half 142b. One of the roll pins 154 is located diametrically in line to provide a stop position for the diaphragm stop disc 150 so that the largest stop opening 156 is aligned with the axis of the lens 96 and a marking f/6.0 on the disc 150 appears in the window 158 of the bottom wall of the shutter housing 102. The other roll pin is positioned to provide a stop, when the disc 150 is rotated to the other extreme, to show a marking of f/22 in the window 158 when the smallest stop opening is aligned with the axis of lens 96. Other markings for the different sized stop openings are f/8, f/11 and f/16. The roll pins 154 are separated by an angle of 147.5 degrees on the diaphragm stop disc 150.

A solenoid actuated flag 160 is positioned above the rotary aperture disc 112 and is shaped to cover the circular stop opening below in the diaphragm stop disc 150, as shown in FIGURES 1, 2 and 4. The solenoid 162 is a rotary type solenoid which when actuated, rotates the flag 160 approximately 36 degrees counterclockwise (FIGURE 4) sufficiently to full clear the diameter of the largest stop opening 156 in the stop disc 150. The Model R133 solenoid manufactured by Rolenoid, Inc. of Culver City, Calif. is an example of a satisfactory rotary solenoid for use in this shutter 16. The flag 160 is secured to the lower end (FIGURE 2) of the output shaft of the rotary solenoid 162.

Various types of damping stops have been tried without success to eliminate bouncing and rebounds of the flag 160 at both limits of its travel. A novel way was ultimately found to completely eliminate the undesired bouncing of the flag 160 at the ends of its travel. This method was accomplished by cutting short arcuate slots such as 164 at corners of the base plate of solenoid 162. Machine bolts 166 were then screwed to the floor partition 102c through washers 166a. Another bolt 166b at a side can be screwed to the partition 102c through washer 166c and spacer 166d (FIGURES 2 and 4). The effect is, of course, to restrain the solenoid 162 from any vertical motion while permitting small angular rotation of the solenoid 162 about its output axle, on its base plate. This angular movement is therefore performed against the inertia of the solenoid 162 and a certain amount of friction existing between surfaces of the base plate of solenoid 162 and the floor partition 102c.

When the flag 160 is in the position shown in FIGURE 4, the shafts of bolts 166 will be against the counterclockwise ends of the short slots 164 due to a previous return of the flag 160 from the actuated position. Energization of the solenoid 162 produces the usual abrupt start typical of solenoids, and the flag 160 is rotated counterclockwise against the force of a return spring to the end of its travel. As the flag 160 makes its abrupt start counterclockwise, the entire solenoid 162 is rotated on its axis until the shafts of bolts 166 meet the clockwise ends of the short slots 164. The initial and abrupt surge of force is thus partially absorbed by the enertia of the solenoid and the concomitant friction between surfaces. Damping of the abrupt surge and movement against the force of the return spring fully eliminate any bouncing or rebounds of the flag 160 at the end of its counterclockwise movement. When the solenoid 162 is de-energized, the return spring rotates the flag 160 clockwise back to its initial position. As the flag 160 nears the end of its clockwise movement, the entire solenoid 162 is gain rotated by the momentum of the flag 160, this time clockwise, until the shafts of the bolts 166 engage the counterclockwise ends of the short slots 164. The lengths of the arcuate slots 164 and the amount of the friction between surfaces are selected to completely eliminate bouncing and rebounds of the flag 160 at the ends of its travel. Rollers, ridges and different types of material can, of course, be used to control or vary friction as required.

Operation of the rotary shutter camera 10 can best be described with reference to FIGURES 5, 6 and 7. FIGURE 7 is a graph illustrating the sinuous output curve 168 of film movement speed versus time, which is produced by the film transport mechanism shown and described with respect to FIGURE 1a. Different IMC speeds and recycling rates can be obtained by adjusting the variable speed drive 42, and shutter operation during the IMC interval is synchronized by means of switch 86 and its actuating linkage. The trip pulse produced by switch 86 is illustrated by the first (top) curve 170 of FIGURE 6. The lower the IMC rate, the longer will be the duration of the trip pulse. The next two curves 172 and 174 illustrate commutator pulses produced respectively by the high speed section 116a and the low speed section 116b of the commutator. Of course, only one or the other is generated according to the selection of shutter speeds by switch 120, and the shutter motor 106 continuously drives the rotary aperture disc 112 at a high or low speed. The trip switch 86 (FIGURE 5) is closed to produce the trip pulse of curve 170. The control coil of relay K1 is connected to the pole of trip switch 86 through a series connected resistor R1 (470 ohms, for example) and the control coil of K1 is grounded through the commutator 116 through either the high or low speed section 116a or 116b, as determined by selector switch 120.

The selector switch 120 is a double pole, double throw switch, and the shutter motor 106 is a two speed D.C. motor having a permanent magnet field, for example. Power, +28 volts, is applied to shutter motor 106 through noise filter 130, and the motor 106 is mechanically coupled to rotate the commutator 116. The armature of the shutter motor is grounded through transistor 128 (2N174, for example). The base electrode of the transistor 128 is connected to +28 volts through the resistor R2. The motor 106 has two sets of governor contacts, high speed 106b and low speed 106c. The high speed contacts can be grounded through the lower pole of selector switch 120. The low speed contacts 106c are normally closed only at low starting speeds. Thus, whenever both the high speed and low speed contacts are open, the positive voltage through resistor R2 to the base of transistor 128 reduces the conduction of transistor 128 from that when either of the high or low speed contacts are closed and grounded. The commutator 116 is accordingly driven normally at a high or low speed as determined by the grounding or non-grounding of the high speed contacts 106c.

Relay K1 is connected as a latching relay and is actuated through resistor R1 connected in series with its control coil. The relay K1 requires a pulse of approximately 8 or 9 milliseconds wide to operate, and remains actuated (latched) for the duration of the trip pulse, as indicated by the fourth curve 176 in FIGURE 6. Actuation of relay K1 applied +28 volts to the flag solenoid 162 through rectifier 162a. The control coil of relay K2 is also energized through a series resistor R3 (3,300 ohms, for example) and is actuated after a delay as shown by curve 178 in FIGURE 6. Flag 160 and solenoid 162 operation is depicted by curve 180, and the inductive buildup of solenoid 162 begins on actuation of relay K1 so that flag motion is begun as indicated with the rise of curve 180. It is seen that the flag and solenoid are fully actuated by the time that relay K2 is energized and operated. When relay K2 is actuated, the inductive kickback energy of solenoid 162 is absorbed by capacitor 182 and the flag 160 is returned by solenoid 162 as shown by curve 180. Since the rotary aperture disc 112 is continuously rotated, an exposure occurs as the aperture 112a sweeps past a diaphragm stop opening after the flag 160 is actuated by the solenoid 162. This is indicated by the seventh and eighth graphs showing plots of shutter open time or the sweep time of aperture 112a for high and low speed shutter motor 106 operation. The unshaded, peaked pulses of curves 182 and 184 illustrate shutter exposures, after the flag 160 is actuated at 1/400 and 1/250 second, respectively, for example.

It is noted that the maximum pulse width or length of the trip pulse is nearly 12 times that of its minimum length. For normal operation of the rotary shutter camera then, the trip pulse can occur anytime without regard to the commutator pulses. That is, synchronization of the leading edge of the trip pulse with respect to those of the high and low speed commutator pulses is not necessary. Consider, for example, the worst condition possible, wherein the trip pulse is of minimum length as shown in curve 170 of FIGURE 6 and the low speed commutator pulses are utilized (low speed shutter operation at maximum IMC rate). If the leading edge of the trip pulse does not occur until after the first commutator pulse but before the next one shown (curve 174), the relay K1 is actuated by the latter commutator pulse, and flag and solenoid operation begun so that flag movement is started about 10 or 12 milliseconds after the actuation of relay K1. From FIGURE 6, it is there shown that the trailing edge of the trip pulse lags the trailing edge of the second low speed commutator pulse by approximately 15 milliseconds. Thus, even if relay K1 failed to respond to the first low speed commutator pulse, the next one would appear in time to actuate the flag 160 before the end of the particular trip pulse. Once flag movement is started, the complete exposure occurs during the last (third) peaked pulse of the eighth curve of FIGURE 6. The relay K2 does not affect the operation of the flag and solenoid since the relay K2 normally grounds the flag solenoid 162 when the relay K2 is not energized. The function of relay K2, when energized, is to deenergize the flag solenoid 162 so that the solenoid 162 does not remain energized for the balance of the trip pulse, once the solenoid 162 has been actuated following actuation of the relay K1.

From the above description it will be apparent that there is thus provided a device of the character described possessing the particular features of advantage before enumerated as desirable, but which is obviously susceptible of modification in its form, proportions, detail construction and arrangement of parts without departing from the principles involved or sacrificing any of its advantages.

Our invention has been described in language more or less specific as to structural features in order to comply with the statute. It is to be understood, however, that the invention is not limited to the specific features shown, but that the means and construction herein disclosed comprise the preferred form of several modes of putting our invention into effect, and the invention is, therefore, claimed in any of its forms or modifications within the legitimate and valid scope of the appended claims.

We claim:

1. A rotary shutter camera, comprising: a magazine including means for moving film in the camera at a sinuously varying rate; a lens cone including a lens positioned on an optical axis for focusing an image on a section of the moving film; a shutter including a diaphragm stop disc having an opening aligned with the optical axis of said lens, a rotating aperture disc positioned adjacent to said stop disc and having an aperture for sweeping past the opening in said stop disc, and a flag element positioned to cover the opening in said stop disc; and circuitry for momentarily deflecting said flag element to uncover the opening in said stop disc for an exposure when the section of film is being moved at a minimum of the sinuously varying rate, said circuitry including a rotary solenoid connected to said flag element and responsively energized for momentarily deflecting the same for an exposure when the section of film is being moved at the minimum of the sinuously varying rate, said rotary solenoid being mounted for limited free travel in a plane wherein inertial and frictional characteristics of said rotary solenoid and plane absorbs abrupt starting and stopping forces produced by said rotary solenoid in momentarily deflecting said flag element.

2. A rotary shutter camera, comprising: a magazine including means for moving film in the camera at a sinuously varying rate; a lens cone including a lens positioned on an optical axis for focusing an image on a section of the moving film; a shutter including a diaphragm stop disc having an opening aligned with the optical axis of said lens, a rotating aperture disc positioned adjacent to said stop disc and having an aperture for sweeping past the opening in said stop disc, and a flag element positioned to cover the opening in said stop disc; and circuitry for momentarily deflecting said flag element to uncover the opening in said stop disc for an exposure when the section of film is being moved at a minimum of the sinuously varying rate, said circuitry including switching means connected to be actuated for a predetermined period when the section of film is being moved at the minimum of the sinuously varying rate, a motor having at least a high and a low speed for driving said aperture disc at a selected speed, a commutator having at least a high speed section and a low speed section and connected to be driven by said motor to produce high and low speed control pulses respectively, means for selecting an operating speed of said motor and a corresponding section of said commutator, and a rotary solenoid connected to said flag element for momentarily deflecting the same for an exposure responsively when said switching means is actuated and a control pulse is produced by a selected section of said commutator.

3. A rotary shutter camera, comprising: a magazine including means for moving film in the camera at a sinuously varying rate; a lens cone including a lens positioned on an optical axis for focusing an image on a section of the moving film; a shutter including a diaphragm stop disc having an opening aligned with the optical axis of said lens; a rotating aperture disc positioned adjacent to said stop disc and having an aperture for sweeping past the opening in said stop disc, and a flag element positioned to cover the opening in said stop disc; and circuitry for momentarily deflecting said flag element to uncover the opening in said stop disc for an exposure when the section of film is being moved at a minimum of the sinuously varying rate, said circuitry including switching means connected to be actuated for a predetermined period when the section of film is being moved at the minimum of the sinuously varying rate, a motor having at least a high and a low speed for driving said aperture disc at a selected speed, a commutator having at least a high speed section and a low speed section and connected to be driven by said motor to produce high and low speed control pulses respectively, means for selecting an operating speed of said motor and a corresponding section of said commutator, a rotary solenoid connected to said flag element for momentarily deflecting the same for an exposure responsively when said switching means is actuated and a control pulse is produced by a selected section of said commutator, said switching means being actuated for a minimum predetermined period which is sufficient for said rotary solenoid to respond to at least two successive low speed control pulses, whereby an exposure can be made on the second of the successive low speed control pulses in the event that said rotary solenoid failed to operate for the first of the two successive control pulses, and means responsive to the actuation of said rotary solenoid for de-energizing the same for any remaining duration of the predetermined period of actuation of said switching means.

4. The invention according to claim 1 wherein said rotary solenoid is of a fixed weight having a flat mounting surface and an output shaft extending perpendicularly therefrom, said rotary solenoid being mounted for limited free angular travel about said output shaft on a plane normally perpendicular to the weight of said rotary solenoid.

5. The invention according to claim 1 including, in addition, means for varying the rotating speed of said aperture disc.

6. The invention according to claim 2 wherein said diaphragm stop disc includes a plurality of different sized openings alignable with the optical axis of said lens, and including, in addition, detent means for accurately aligning and securing any one of the different sized openings with the optical axis of said lens.

References Cited in the file of this patent

UNITED STATES PATENTS

| | | |
|---|---|---|
| 378,426 | Bliss et al. | Feb. 28, 1888 |
| 2,474,323 | Rattray | June 28, 1949 |